Jan. 26, 1971         G. W. JACKSON ET AL         3,558,155
SEMIAUTOMATIC, OPEN LOOP LEVELING SYSTEM
Filed May 1, 1969                                 2 Sheets-Sheet 1

INVENTORS.
George W. Jackson, &
BY  James E. Whelan

J.C. Evans
ATTORNEY

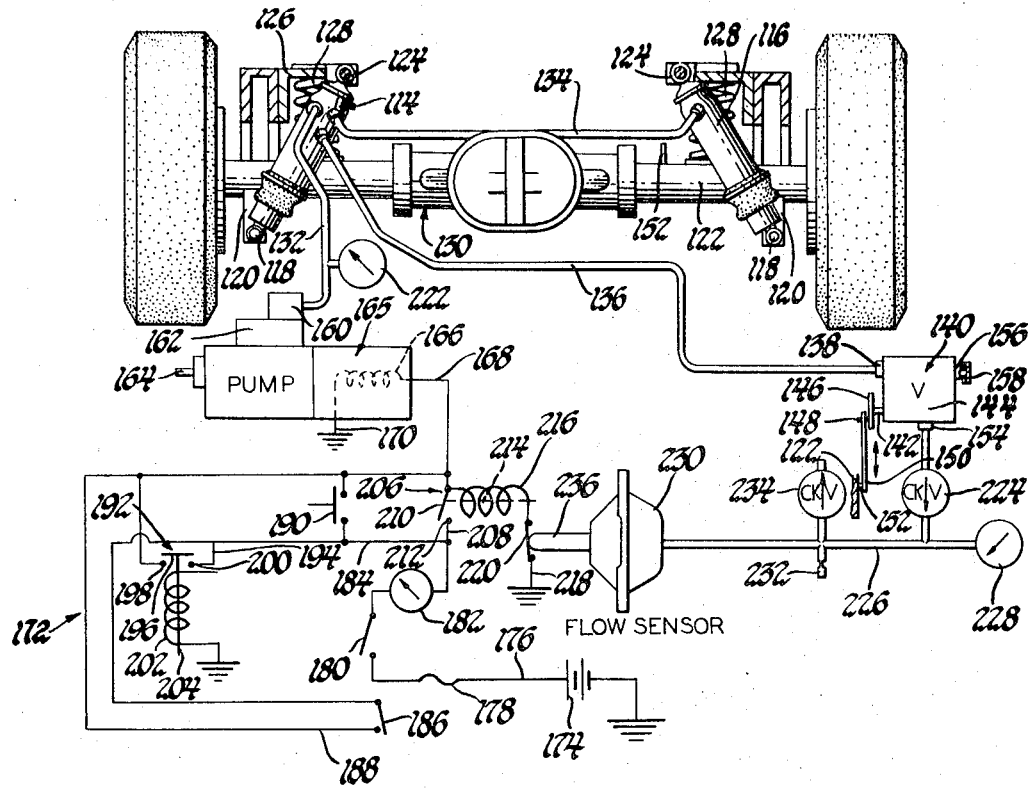

United States Patent Office 3,558,155
Patented Jan. 26, 1971

3,558,155
SEMIAUTOMATIC, OPEN LOOP LEVELING SYSTEM
George W. Jackson and James E. Whelan, Dayton, Ohio, assignors to General Motors Corporation, Detroit, Mich., a corporation of Delaware
Filed May 1, 1969, Ser. No. 820,726
Int. Cl. B60g 11/56
U.S. Cl. 280—124                5 Claims

ABSTRACT OF THE DISCLOSURE

In preferred form, a semiautomatic vehicle leveling system including fluid spring means connected between the sprung and unsprung mass of a vehicle for maintaining a predetermined height relationship therebetween. It includes an electric motor driven compressor having an inlet connected to atmosphere and an outlet in direct communication with the fluid spring means. The drive motor is energized by circuit means including a first circuit having a manually operated start switch to momentarily energize the drive motor. The circuit means further includes a second circuit having a relay operated switch therein which completes an energization holding circuit for the drive motor. The system further includes a mechanical height controller responsive to changes in the height relationship of the sprung and unsprung mass to exhaust fluid from the fluid spring means. A flow sensing unit includes means responsive to a predetermined exhaust of fluid to condition the relay operated switch so as to deenergize the motor when the vehicle is level.

---

This invention relates to level control systems for maintaining a predetermined height relationship between the sprung and usprung mass of a vehicle and more particularly to a system that is semiautomatic and open to atmosphere.

It is recognized that open system leveling arrangements eliminate pressure regulators, high pressure storage tanks and the like found in closed automatic leveling systems.

In open system vehicle leveling arrangements it is desirable to control flow of high pressure fluid to fluid spring means connected between the sprung and unsprung mass to produce a supplemental load carrying action that will vary in accordance with changes in static loading on the sprung mass and to do so without condensing large quantities of moisture in the system.

Furthermore, it is desirable that some means be included in the system to show that is is fully operative when changes in the static load produce changes in the attitude of the sprung mass with respect to the unsprung mass that are not readily observable.

Accordingly, an object of the present invention is to provide a fail safe, semiautomatic vehicle leveling system that is open to atmosphere and which is operated only in response to changes in the static loading on the sprung mass of a vehicle thereby to prevent excessive flow of ambient air and moisture condensation in fluid spring means of the system.

Another object of the present invention is to provide a leveling system of the type including a fluid spring between the sprung and unsprung masses of the vehicle wherein high pressure reservoirs and pressure regulators are eliminated by connecting a compressor directly to fluid spring components and controlling the pressure level the fluid springs by means including an electrically energized drive motor for the compressor having a primary energization circuit operated by means including a mechanical height controller for sensing the relative height position between the sprung and unsprung mass and a flow sensor unit that detects exhaust flow from the fluid spring means and the controller when the sprung mass moves above a predetermined height relationship with respect to the unsprung mass; and wherein once the drive motor is de-energized the height controller and flow sensor unit are operative to maintain a predetermined continued exhaust of fluid from the fluid spring means until the vehicle is returned to its desired height relationship.

Another object of the present invention is to provide an improved semiautomatic open loop vehicle leveling system having fluid spring means connected between the sprung and unsprung mass of the vehicle that are pressurized during a fill phase of operation by an electric motor driven compressor having its inlet connected to atmosphere and its outlet directly connected to the fluid spring and wherein the energization of the compressor motor is terminated by means including a mechanical height controller responsive to movement of the sprung mass above the unsprung mass for connecting an exhaust conduit from the fluid spring means to atmosphere and a flow sensor unit that conditions circuit means for de-energizing the drive motor; the height controller and flow sensor cooperating during an exhaust phase of operation to deflate the fluid spring means a predetermined amount while maintaining the compressor de-energized and maintaining the fluid spring closed following the exhaust phase and also maintaining the compressor motor deenergized following the exhaust phase to reduce moisture condensation in the system.

These and other objects of the present invention are attained in one working embodiment of the invention that includes a pair of combination shock absorber and air spring assemblies adapted to be connected between the sprung and unsprung mass of the vehicle and operative to compensate for changes in the static loading on the vehicle. An electric motor driven air compressor has its outlet directly connected to the air springs and its inlet connected to atmosphere. The drive motor is energized by electric circuit means including a first circuit for momentarily connecting the drive motor to a vehicle battery and a second circuit that is responsive to momentary closure of the first circuit to complee a circuit for the drive motor through means including a hold switch. The hold switch is controlled by a pressure operator in a flow sensor assembly.

An exhaust conduit from the fluid springs is connected through a mechanically operated height controller that is responsive to changes in the height relationship between the sprung and unsprung masses of a vehicle to exhaust fluid from the fluid springs when the vehicle chassis is moved above level. Fluid flow through the controller is sensed by the flow sensor to cause the pressure operator to condition the hold switch to de-energize the pump motor when the fluid springs are being exhausted.

The fluid springs are exhausted directly to atmosphere through the height controller and a conduit connected to atmosphere until the vehicle is returned to a level position. Thereafter it is necessary to reclose the momentary start circuit to reinstitute a fill phase of operation.

Further objects and advantages of the present invention will be apparent from the following description, reference being had to the accompanying drawings wherein preferred embodiments of the present invention are clearly shown.

FIG. 3 is a diagrammatic view of a second embodiment of the invention combining both mechanical and electrical systems therein; and FIG. 4 is a diagrammatic view of still another embodiment of the leveling system of the present invention.

Figure 1:
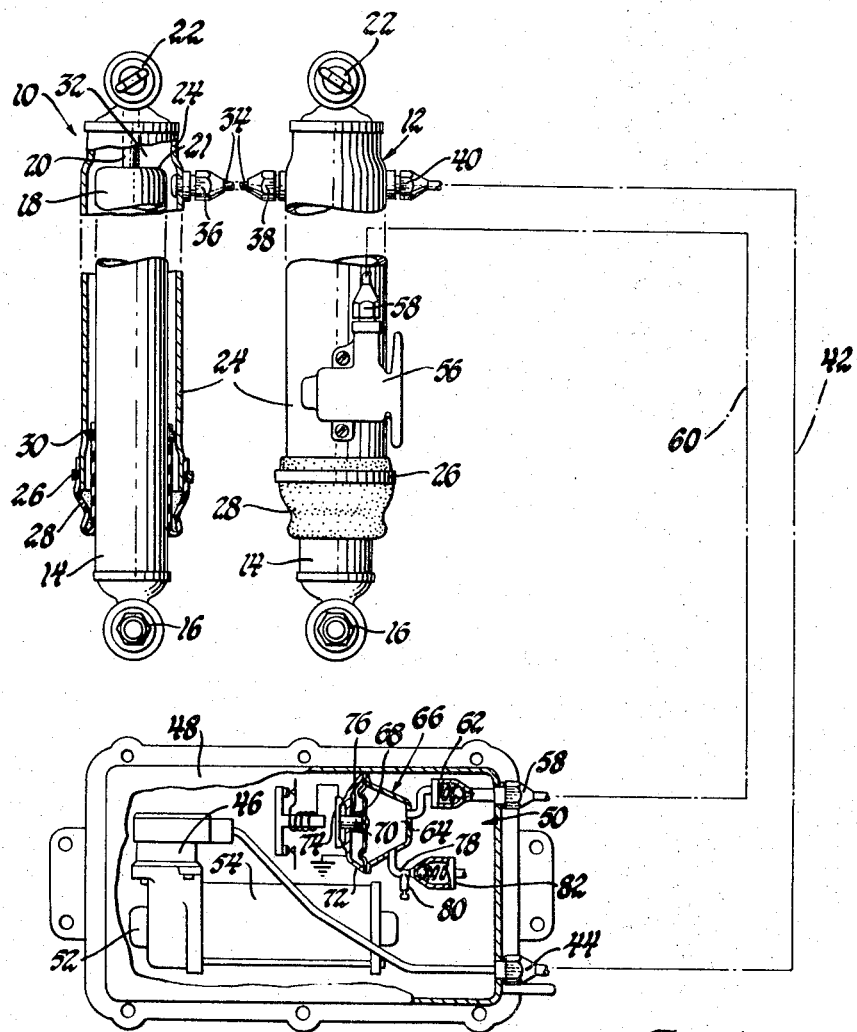
FIG. 1 is a diagrammatic view of a leveling system including the concepts of the present invention.

Referring now to FIG. 1, a leveling system is illustrated including a pair of combination shock absorber and fluid spring units 10, 12.

Each of the assemblies 10, 12 includes a double direct acting hydraulic shock absorber 14 having a base mount assembly 16 thereon adapted to be connected to the unsprung mass of a vehicle, for example, a ground engaging rear axle assembly. It also includes a cylindrical outer housing 18 having a piston rod 20 directed exteriorly through the upper end 21 thereof for connection to an upper mount 22 which is adapted to be connected to the sprung mass of a vehicle for example its lower chassis frame.

The piston rod 20 is also connected to a cylindrical dust shield 24 which is located in surrounding telescoping relationship with the cylinder 18. The lower open end of the shield 24 is connected by means of a clamp ring 26 to one end of a flexible sleeve 28 that is turned on itself into the space between the shield 24 and the cylinder 18 against the outer surface of the cylinder 18 where it is sealingly secured by means of a clamp ring 30.

The shock absorber cylinder 18, dust shield 24 and sleeve 28 cooperate to define a pressurizable control chamber 32 for varying the resultant force between the bottom mount assembly 16 and top mount assembly 22 that supplements the spring force of a primary suspension spring in the system.

In the illustrated arrangement the control chambers 32 are interconnected by a cross tube 34 connected between fluid fittings 36, 38 on the dust shields 24 of the respective assemblies 10, 12.

The assembly 12 also includes an inlet fitting 40 thereon which communicates with a supply conduit 42 which is connected to the outlet 44 of a reciprocating compressor 46 located within a support canister 48.

The interior 50 of the canister 48 is in communication with the atmosphere whereby an inlet 52 to the compressor 46 is open to atmosphere.

Additionally, the compressor 46 is operatively connected to a direct current permanent magnet type electric drive motor 54.

The system further includes a mechanical height controller 56 on the dust shield 24 of the assembly 12 which includes an interior port (not shown) that communicates with the control chamber 32 of assembly 12. It also includes valve means responsive to the relative height position between the top of the cylinder 18 and the dust shield 24 for controlling fluid flow from the control chamber 32 through an outlet port or fitting 58. An exhaust conduit 60 communicates the fitting 58 with a minimum pressure check valve 62 which in turn is communicated with a control chamber 64 of an air flow sensor unit 66.

For purposes of the present invention it is only necessary to point out that the unit 66 includes a pressure responsive movable diaphragm 68 that carries an operator element 70 of the unit 66 into operative engagement with a double pole, single throw level termination switch 74. The diaphragm 68 is maintained by a return spring 76 in a position that maintains the switch 74 normally closed.

The unit 66 further includes a tube 78 that connects the control chamber 64 with an orifice 80 in communication with the interior 50 of the canister 48 for communication with atmosphere. Also the unit includes a check valve 82 that defines the primary fluid flow path through the controller 64 for exhaust of the assemblies 10, 12 following actuation of the switch 74 by the unit 66.

Figure 2:
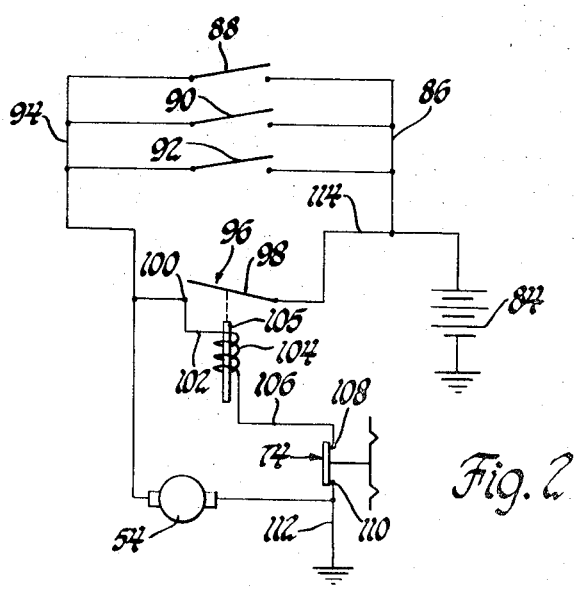
FIG. 2 is a schematic view of an electrical circuit that controls the operation of the system of FIG. 1.

Referring now to the electrical circuit diagram of FIG. 2, a system is illustrated that includes an energization circuit for DC motor 54 from the positive terminal of a vehicle battery 84 thence through a conductor 86 through one of a plurality of momentary start switches including an ignition operated switch 88, a switch 90 coupled for operation in conjunction with the headlamp switch and a dash mounted operating switch 92. Each of the switches is a single pole, single throw switch and each of the switches is connected by a conductor 94 to one side of the motor 54. The opposite side of the motor 54 is connected to ground.

Additionally, the control circuit includes a relay controller switch 96 having a movable switch blade 98 normally open with respect to a contact 100 which is connected by a conductor 102 to one end of a solenoid coil 104 which surrounds a movable, switch blade supporting armature 105. A conductor 106 connects the opposite end of the coil 104 to a fixed contact 108 of the double pole single throw switch 74. A second fixed contact 110 of switch 74 is electrically connected by conductor 112 to ground.

In accordance with certain principles of the present invention the above described system is semiautomatic in that it includes a plurality of circuits between the positive terminal of battery 84 and the motor 54 that are completed for a limited period of time by one of a plurality of momentary start switches. Each of the switches is a separate function switch that is likely to be operated in the course of vehicle operation once the vehicle has been loaded and driven away from a curb location.

Thus, when the vehicle ignition switch is turned on the momentary start switch 88 will close for a limited period of time to complete an energization circuit from the battery 84 through conductor 86, switch 88, conductor 94 thence through the winding of motor 54 to ground.

This will institute a fill phase of operation wherein the reciprocating compressor 46 is operated to draw fluid from the atmospheric interior 50 of the canister 48 and discharge it at a higher pressure through the supply conduit 42 and the inlet fitting 40 to the pressurizable control chambers 32 of the shock absorber and fluid spring assemblies 10, 12. This will result in an increase in the resultant uplifting force on a sprung mass of a vehicle, for example, the lower frame of its chassis to correct deflection of the primary suspension spring caused by vehicle load.

Simultaneously, with this initial pressurization of the control chambers 32 of the assemblies 10, 12 the control circuit of FIG. 2 is operative to complete a holding circuit for the relay operated hold switch 96. More specifically, when the momentary switch 88 is closed the positive terminal of battery 84 will be connected with the contact 100 and thence through the coil 104, conductor 106, closed switch 74 and conductor 112 to ground. This will cause the armature 105 to move to close the switch blade 98 against the contact 100.

When the momentary start switch 88 opens, a motor energization circuit is completed from the positive terminal of the battery 84 through a conductor 114 thence through the blade 98 and switch 96 and the conductor 94 to the motor 54 thence to ground.

The hold switch 96 will maintain the compressor energized to build up the pressure in the control chambers 32 so as to correct for any load that might have been added to the vehicle just prior to its operation. The relay operated switch 96 is maintained closed by a hold circuit that is defined from the positive terminal of the battery 84 through the conductor 114, the closed switch 96, the coil 104 thence through the closed termination switch 74 and conductor 112 to ground.

When the height controller 56 senses a relative positioning of the dust shield 24 with respect to the shock absorber cylinder 18 corresponding to a desired predetermined height relationship between the sprung and unsprung mass, it communicates the control chambers 32 of the assemblies 10, 12 in direct communication with the exhaust conduit 60.

This constitutes the beginning of an exhaust phase of operation which occurs prior to final level.

More particularly, high pressure fluid in the exhaust conduit 60 will pass through the minimum pressure check valve 62 into the chamber 64 of the air flow sensor unit 66. The movable diaphragm 68 and the operator element 70 thereon move exteriorly of the housing 72 so as to move the blade of double pole, single throw switch element 74 away from the fixed contacts 108, 110 thereof. This, with reference to the electrical circuit of FIG. 2, causes the energization circuit for the coil 104 to be interrupted and as a result the armature 105 and the switch blade 98 of the relay operated hold switch 96 are positioned so as to open the motor energization circuit across the switch 96.

Hence, the electric motor 94 is de-energized only after the sprung mass is moved above its desired predetermined height relationship with respect to the unsprung mass as sensed by the mechanically operated height controller 56.

The exhaust phase of operation continues under the control of the mechanically operated height controller 56 and pressure exhausted from the chambers 32 through the exhaust conduit 60 will continue to pass through chamber 64 of the unit 66 thence through the check valve 82 constituting the primary exhaust path into the atmospheric interior 50 of the canister 48.

Following a predetermined exhaust phase of operation the pressure in the control chambers 32 will reach a point where the static load on the sprung mass will be balanced and the height controller 56 will sense the desired relative height relationship between the sprung and the unsprung mass which is reflected by a predetermined relative position between the dust shield 24 and the cylinder 18 of the assembly 12. At this time the controller 56 will block communication between the control chambers 32 and the exhaust conduit 60. A bleed of trapped exhaust fluid in the chamber 64 will occur through the orifice 80 to produce a predetermined pressure therein at which the return spring 76 will position the blade of double pole single throw termination switch 74 against its fixed contacts 108, 110 prior to a subsequent fill phase of operation.

Following this positioning of the termination switch 74, it will be noted that all of the switches between conductor 86 and conductor 94 are opened including the relay operated hold switch 96. Hence, any further system operation depends upon manual operation of one of a plurality of the momentary start switches 88, 90 or 92.

Typically, following the over-pressure exhaust phase of operation the pressure level in the control chambers 32 will be that which is necessary to support the static load on the sprung mass of the vehicle.

This static load typically is retained on the vehicle during its travel and the only possible re-energization of the motor 54 would occur when the headlamp switch 90 is closed at dark. Under such a circumstance, the aforedescribed fill phase of operation would be initiated and fluid would be directed into the control chambers 32 for a very limited period of time following which the above described over-pressure exhaust phase of operation would again occur to de-energize the motor.

If a leak develops in the assemblies 10, 12 capable of deflating the control chambers 32 the only effect is that the static load of the vehicle will be carried solely by the primary suspension spring component as is the case in the absence of leveling systems. Accordingly, the system is fail safe and will not produce an undue drain on the battery when the vehicle is stopped.

If one of the momentary start switches is closed to complete the motor energization circuit, the compressor 46 will be operated thereby to direct pressurized fluid into the control chambers 32. Concurrently, the relay operated switch 96 will be closed to complete a holding circuit for energization of the motor 54 as mentioned above. The compressor will continue to operate only as long as the control valve 56 isolates the exhaust conduit 60 from the control chambers 32 of the assemblies 10, 12. Thereafter the sensor unit 66 will operate as described above to terminate further motor operation.

One advantage of the above described system is that the operator of the vehicle is aware of the fact that the level system is operating. This will definitely be the case when the momentary dash mounted start switch 92 is used to initiate leveling. Also, it will be observed when the momentary start switch 88 coupled with the ignition switch is closed as the vehicle is started. Additionally, it will be observed when the headlamp switch 90 is turned on and a load change on the vehicle has not been adjusted.

The system is such that the car does not have to be moved to correct for static load changes thereon. Furthermore, it is not necessary to turn on the engine since either the headlamp switch or the momentary dash mounted switch would suffice to accomplish initiation of a leveling cycle of operation including the above mentioned fill phase and over pressure exhaust phases of operation.

In the aforedescribed system the mechanical and electrical components have the following rating:

| Components: | Ratings |
| --- | --- |
| Compressor 46 | .136 cu. in. displacement. |
| DC motor 54 | 5 amps at 12 volts. |
| Combination shock absorber and air spring assemblies 10, 12 | 10–125 p.s.i.g. |

In one working embodiment of a system having the aforedescribed components a maximum distributed static load of from 1100–1200 pounds is corrected within 2½ minutes. Following removal of load, correction required to return the vehicle to level to its desired predetermined height relationship is less than one minute.

In addition to having adequate capacity to correct for the aforedescribed loadings this system has the advantage of an increasing spring rate in the assemblies 10, 12 upon an increase load on the vehicle whereby a pre-selected frequency of road movement will be retained.

Furthermore, this system requires little space or modification to existing chassis and axle assembly components to be installed on a vehicle. A further advantage of the system is that it has no adverse affect on engine operation.

Another embodiment of the invention is illustrated in FIG. 3 which shows a modified height controller in the system and modified means for observing the operative phases of operation within the system.

This embodiment includes a pair of spaced apart combination shock absorber and air spring assemblies 114, 116. They each include a bottom end mount 118 that is secured to a control arm 120 fixedly connected to an axle housing 122. They also each include an upper end mount 124 that is connected to the lower frame 126 of a vehicle chassis.

A primary coil spring suspension component 128 is connected between each arm 120 and the lower frame member 126.

Changes in the static load on the chassis will cause the primary springs 128 to deflect so as to move the chassis from a desired predetermined relationship with respect to the rear axle assembly 130. This will be corrected by the assemblies 114, 116.

In the illustrated arrangement, the system includes a supply conduit 132 that is connected to a control chamber of the assembly 114 that corresponds to control chamber 32 as described in the embodiment of FIGS. 1 and 2. A cross-over tube 134 connects this chamber with a like control chamber in the assembly 116.

Also included is an exhaust conduit 136 that is connected to the inlet 138 of a mechanical height controller 140 of the three position type.

More particularly, the height controller 140 includes an operating shaft 142 that is directed exxteriorly of a valve housing 144. The shaft 142 is fixedly connected to one end of a lever 146 that has its opposite end pivotally connected by a pin 148 to a link 150 which is connected to the axle housing 122 by a pivot pin 152.

In this arrangement when the lower frame 126 is loaded so that the primary suspension springs 128 deflect to cause the sprung mass to move below a desired predetermined height relationship with the unsprung mass, represented by the rear axle assembly 130, the link 150 and lever 146 will rotate the shaft 142 to condition valve means in the height controller 140 to block communication between the inlet 138 of the controller 140 and an outlet 154 therefrom.

Under circumstances where the static loading on the frame 126 is reduced, causing the primary suspension springs 128 to raise it above its desired predetermined relationship with respect to the rear ground engaging axle assembly 130, the link 150 and the lever 146 will rotate the shaft 142 so as to communicate the inlet 138 of controller 140 with the outlet 154 thereof.

When the vehicle is in its desired height relationship the valve means will be conditioned by the shaft 142 to also block communication between the inlet 138 and outlet 154.

For purposes of the present invention the aforedescribed description of the three position height controller 140 will suffice. For a more specific example of a valve of this type reference may be had to U.S. Pat. No. 2,976,053 to Pribonic issued Mar. 21, 1961.

In the present arrangement the valve 140 corresponds to the Pribonic arrangement with a modification in that a third fluid fitting 156 on the valve 140 is plugged by means of a cap 158 wherein it is normally opened in the Pribonic structure.

The supply conduit 132 is connected to the outlet 160 of a reciprocating compressor 162 which has its inlet 164 in communication with atmosphere. In this arrangement the pump 162 is driven by an electric drive motor 165.

The run winding 166 of the drive motor 165 has one end thereof connected to a supply conduit 168 and the opposite end thereof connected by a conductor 170 to ground.

The electric motor 165 has its energization controlled by an electric control circuit 172 so as to vary the fluid pressure level in the assemblies 114, 116 to correct for changes in the static loading on the vehicle.

More particularly, the electric control circuit includes a first start circuit from the positive terminal of a vehicle battery 174, through a conductor 176, a fuse 178 and a system disconnect switch 180 to one side of an ammeter 182 with a 0 to 15 amp indicator.

The opposite side of the ammeter is connected by a conductor 184 to a momentary start switch 186 that is operated when the headlamp switch is conditioned to turn the headlights of the vehicle on. The first circuit thence passes through a conductor 188 to the supply conductor 168 to the winding 166 and the ground conductor 170 whereby the compressor 162 will operate to directly charge the control chambers of the assemblies 114, 116 for a period of time established by the time delay in momentary start switch 186.

The circuit further includes a second start circuit for energizing the winding 166 that includes a dash mounted momentary start switch 190 that is electrically connected between the conductor 184 and conductor 188 and when closed will serve the same functional purpose as does the momentary start switch 186 that operates when the headlights are turned on.

Additionally, the circuit includes a relay operated start switch 192 that is included in a conductor 194 connected across the conductors 184, 188. The switch 192 includes a double pole, single throw blade 196 that is normally maintained open with respect to a pair of switch contacts 198, 200.

However, when the vehicle is started a starter motor terminal coil 202 is energized to cause an armature 204 to position the switch blade 196 so as to bridge contacts 198, 200. Accordingly, the relay operated switch 192 completes a third start circuit for energizing the coil 166 again serving the same functional purpose as does the momentary switch 186 operated off the headlight switch of the vehicle and the momentary dash mounted start switch 190.

When the vehicle engine is run the coil 202 will be de-energized causing the switch 192 to assume its illustrated open position.

Each of the above described circuits within the electrical control system 172 independently serves to complete a hold circuit for the winding 166.

More particularly, the hold circuit includes a relay operated switch 206 that is connected in a conductor 208 across conductors 184, 188.

The switch 206 is illustrated as including a single pole single throw blade 210 that is operatively positioned with respect to a fixed contact 212 by a movable armature 214. The armature 214 is acted upon by a coil 216 that has one end thereof electrically connected to the conductor 188 and the opposite end thereof electrically connected by a conductor 218 to ground through a normally closed hold termination switch 220.

In this embodiment of the invention the relay operated hold switch 206 will be conditioned, when any one of the momentary start switches 186, 190, 192 is closed, to maintain the run winding 166 energized. This continues after a time delay that causes the momentary start energization circuits of the system 172 to open.

The motor 165 will operate the compressor 162 until the pressure level, which is indicated by a pressor indicator 222 in the supply conduit 132, reaches a point at which the sprung mass represented by the lower frame 126 and vehicle chassis is raised slightly above a desired height relationship with respect to the rear axle assembly 130. At this time the link 150 will pull the lever 146 downwardly so as to rotate the shaft 142 in a direction to cause the internally located valve means of the controller 140 to open communication between the inlet 138 and the outlet fitting 154 on housing 144.

This will cause high pressure fluid from the control chambers of the assemblies 114, 116 to pass through a one-way check valve 224 into a conduit 226 having one end thereof connected to a pressure indicator 228 and the opposite end thereof connected into a flow sensor 230 like the flow sensor unit 66 described in the embodiment of FIGS. 1 and 2. Intermediate the indicator 228 and the flow sensor 230 is located a small diameter orifice fitting 232 that communicates with atmosphere. Conduit 226 is also connected to a high volume one-way check valve 234 through which the greatest amount of the exhaust fluid through the controller 140 is directed back to atmosphere.

As was the case with the first embodiment, when the over travel exhaust occurs, the excessive fluid in the assemblies 114, 116 will flow through the check valve 234 to atmosphere and concurrently the flow sensor 230 will have its switch operator 236 positioned to open the termination switch 220 whereby the coil 214 is deenergized.

This will open the relay operated hold switch 206 and de-energize the motor 165. At this point all of the momentary switches 186, 190 and 192 are open and further level correction requires a manipulation of one of these momentary start switches as was the case in the first embodiment.

In the embodiment of FIG. 4 of the invention a semi-automatic open loop leveling system 240 is illustrated for maintaining a desired predetermined height relationship between a rear axle assembly 242 of a vehicle and a lower frame 244 of the vehicle chassis. As was the case in the embodiment of FIG. 3, the lower frame 244 is supported on the axle assembly 242 by means including a pair of spaced apart primary coil springs 246, 248. A pair of spaced apart combination shock absorber and air spring units 250, 252 are included in the system for correcting deflection in the primary coil springs 246, 248 as caused by changes in the static loading on the vehicle chassis.

More particularly, in this embodiment, as was the case in the previous embodiments, a compressor 254 that is driven by an electric drive motor 256 has its outlet connected by a conduit 258 to the shock absorber and air spring assembly 250. A cross over tube 260 communicates the control chamber of assembly 250 with that of the assembly 252. The system is open loop in that the inlet 262 of the compressor 254 is in communication with atmosphere.

In this embodiment of the invention the assemblies 250, 252 are exhausted by delayed opening height controller 264 which includes a valve operated when the lower frame 244 moves about its desired predetermined height relationship with the unsprung mass to open and allow flow of fluid to a flow sensor unit 266 like that illustrated in the first embodiment. This exhaust flow occurs through an exhaust line 268 that communicates with a high volume check valve 270 in communication with atmosphere. Also, a small diameter orifice fitting 272 is included between the control chamber of the flow sensor 266 and atmosphere for reasons stated with reference to the like fitting 80 in the embodiment of FIGS. 1 and 2.

In this arrangement, the energization of the motor 256 is controlled by a system 274 that includes a momentary start circuit from a positive terminal of a vehicle battery 276 thence through a conductor 278 to either a momentary start switch 280 operated off of the ignition switch when the car is started or a momentary start switch 282 that is driver operated and located on the dash board of the vehicle.

When either of the momentary start switches 280, 282 is closed the conductor 278 is connected to a conductor 280 that connects to one end of a coil 282 of a relay operated hold switch 284. The opposite end of coil 282 is connected by a conductor 286 to ground. When the coil 282 is energized it draws an armature 288 in a direction to move a double pole, single throw switch blade 290 of the switch 284 into electrical engagement with a pair of spaced apart fixed contacts 292, 294. This connects battery 276 through a conductor 296 to one end of run winding 298 of motor 256. The opposite end of the winding 298 is connected by conductor 300 to ground.

In this embodiment of the invention the armature 288 includes a latch 302 on one end thereof that mechanically connects to a release operator or arm 304 when the relay operated switch 284 is closed. The release operator 304 corresponds to the switch operators of previous embodiments 70, 236, and will retain the relay switch 284 closed.

As soon as exhaust flow is sensed by the air flow sensor 266 the release arm 304 will move away from the latch 302 to cause a return spring 306 to move blade 290 from the spaced apart contacts 292, 294 to de-energize the motor 256 as was done in the previously described embodiments.

While the embodiments of the present invention, as herein disclosed constitute preferred forms, it is to be understood that other forms might be adopted.

We claim:

1. A semiautomatic vehicle leveling system for maintaining a predetermined height relationship between the sprung and unsprung mass of a vehicle comprising fluid spring means adapted to be connected between the unsprung mass and the sprung mass for maintaining a predetermined height relationship therebetween, a compressor including an inlet and an outlet in direct communication with said fluid spring means, electric motor means for driving said compressor, electric circuit means for energizing said motor including first circuit means having a momentary switch therein for momentarily connecting said motor to a power source, said electric circuit means including a second circuit therein having holding switch means therein, means responsive to closure of said momentary switch in said first circuit to condition said holding switch means to maintain said motor energized when said first circuit is interrupted, controller means for sensing movement of the sprung mass above its predetermined height relationship with said unsprung mass to exhaust fluid from said fluid spring means, means for sensing exhaust from said fluid spring means to condition said holding switch means to de-energize said motor means, said means for exhausting fluid from said fluid spring means maintaining exhaust of fluid therefrom following motor de-energization until the sprung and unsprung mass are returned to the desired height relationship.

2. A semiautomatic leveling system for maintaining a predetermined height relationship between the sprung and unsprung mass of a vehicle and to supplement the load carrying capacity of a primary spring component between the sprung and unsprung mass comprising: fluid spring means adapted to be connected between the sprung and unsprung mass, a pressure source, electrical circuit means for conditioning said pressure source to supply pressurized fluid to said fluid spring means for increasing the load carrying capacity thereof, said electrical circuit means including a momentary start switch and a hold switch, a source of power, said momentary start switch completing a momentary circuit for conditioning said pressure source to pressurize said fluid spring means, holding circuit means responsive to completion of said momentary circuit for conditioning said hold switch to maintain said circuit means conditioned for sustaining flow of pressurized fluid to said fluid spring means, said holding circuit means including a termination switch, a height controller responsive to changes in the height relationship between the sprung and unsprung mass including an outlet for exhaust of fluid from said fluid spring means, when the sprung mass raises above its predetermined height relationship with the unsprung mass, flow sensing means, means communicating said height controller outlet with said air flow sensing means including a bleed conduit, said flow sensing means including an operator to condition said termination switch of said holding circuit means when exhaust flow is sensed by said flow sensor, said hold switch being conditioned when said operator drops said holding circuit means to condition said circuit means and pressure source to prevent further flow of pressurized fluid into said fluid spring means, said height controller maintaining communication between said fluid spring means and said bleed conduit until the sprung and unsprung mass are returned to a desired predetermined height relationship therebetween.

3. In a system for maintaining a predetermined height relationship between the sprung and unsprung masses of a vehicle comprising: fluid spring means adapted to be connected between the sprung and unsprung masses for maintaining a predetermined height relationship therebetween, a compressor having an inlet and an outlet in direct communication with said fluid spring means, electric motor means for driving said compressor, energization circuit means for electrically connecting said motor to a battery including a relay operated switch with an energizable coil, holding circuit means for energizing said coil when said motor is energized, said holding circuit means including a normally closed switch, an exhaust conduit connected to said fluid spring means, height controller means for detecting changes in the relative height relationship between the sprung and unsprung mass and for communicating said exhaust conduit with said fluid spring means when the sprung mass is above its desired predetermined height relationship with respect to the unsprung mass, pressure responsive means for sensing fluid flow through said conduit and operative to open said normally closed switch of said holding circuit means to de-energize said coil and said compressor motor upon exhaust flow through said exhaust conduit.

4. In a semiautomatic leveling system for maintaining a predetermined height relationship between the sprung and unsprung masses of a vehicle the combination of, fluid spring means adapted to be connected between the sprung and unsprung mass for supplementing a primary coil spring to adjust for deflection therein as produced by changes in static loading on the sprung mass, a pump having an inlet and an outlet directly connected to said fluid spring means, an electric motor for driving said pump, a power source, means for energizing said motor including switch means operative to complete a momentary energization circuit between said electric motor and said power source, a relay operated switch having an energizable coil, means responsive to completion of said momentary motor energization circuit including a holding circuit for said relay operated switch coil to condition said relay operated switch to complete a continuous energization circuit between said power source and said electric motor, said holding circuit means including a termination switch, pressure responsive operator means for operating said termination switch to de-energize said holding circuit means, an exhaust conduit from said fluid spring means, a height controller responsive to movement of the sprung mass above its predetermined height relationship with respect to the unsprung mass to communicate said fluid spring means with said exhaust conduit, said pressure operator including means responsive to fluid flow in said exhaust conduit to condition said termination switch to drop said holding circuit means and de-energize said pump motor.

5. In a semiautomatic leveling system for maintaining a predetermined height relationship between the sprung and unsprung masses of a vehicle the combination of, fluid spring means adapted to be connected between the sprung and unsprung mass for supplementing a primary coil spring to adjust for deflection therein as produced by changes in static loading on the sprung mass, a pump having an inlet and an outlet directly connected to said fluid spring means, an electric motor for driving said pump, a power source, means for energizing said motor including switch means operative to complete a momentary energization circuit between said electric motor and said power source, a relay operated switch having an energizable coil, means responsive to completion of said momentary motor energization circuit including a holding circuit for said relay operated switch coil to condition said relay operated switch to complete a continuous energization circuit between said power source and said electric motor, said holding circuit means including a termination switch, pressure responsive operator means for operating said termination switch to de-energize said holding circuit means, an exhaust conduit from said fluid spring means, a height controller responsive to movement of the sprung mass above its predetermined height relationship with respect to the unsprung mass to communicate said fluid spring means with said exhaust conduit, sair pressure operator including means responsive to fluid flow in said exhaust conduit to condition said termination switch to drop said holding circuit means and deenergize said pump motor, and bleed means connected between said operator means and said height controller for maintaining flow from said exhaust conduit until a predetermined pressure exists in said fluid spring means, said height controller blocking communication between said fluid spring means and said exhaust conduit when the spring mass is lowered to its desired height relationship with respect to the unsprung mass.

References Cited
UNITED STATES PATENTS

| | | | |
|---|---|---|---|
| 3,071,394 | 1/1963 | Miller | 280—124(F) |
| 3,082,018 | 3/1963 | Smirl | 280—124(F) |
| 3,120,962 | 2/1964 | Long | 280—6(H) |

PHILIP GOODMAN, Primary Examiner